United States Patent

[11] 3,627,011

[72] Inventor John E. Pond
  Granada Hills, Calif.
[21] Appl. No. 50,739
[22] Filed June 29, 1970
[45] Patented Dec. 14, 1971
[73] Assignee Universal City Studios, Inc.
  Universal City, Calif.

[54] METHOD AND APPARATUS FOR PEELING BANANAS
  43 Claims, 28 Drawing Figs.
[52] U.S. Cl. .................................. 146/223,
  146/5, 146/241
[51] Int. Cl. .................................. A23n 7/00
[50] Field of Search .......................... 146/5, 223, 241

[56] References Cited
UNITED STATES PATENTS
3,451,451 6/1969 Polk, Jr. .................. 146/5
3,482,615 12/1969 Green et al. .............. 146/241 X

*Primary Examiner*—Willie G. Abercrombie
*Attorney*—Lyon & Lyon

ABSTRACT: An apparatus for removing the peel from the fruit of a banana includes means to guide and position the banana after it is fed into the apparatus and peeling means which cause a plurality of grip members to engage and grip longitudinal segments of the peel and, as the fruit of the banana moves past the peeling means, the grip members pull each segment from the fruit and continue to pull until the peel is completely removed. The removed peel segments are then released from the grip members and the whole fruit is passed on for further processing.

Patented Dec. 14, 1971
3,627,011
9 Sheets-Sheet 1
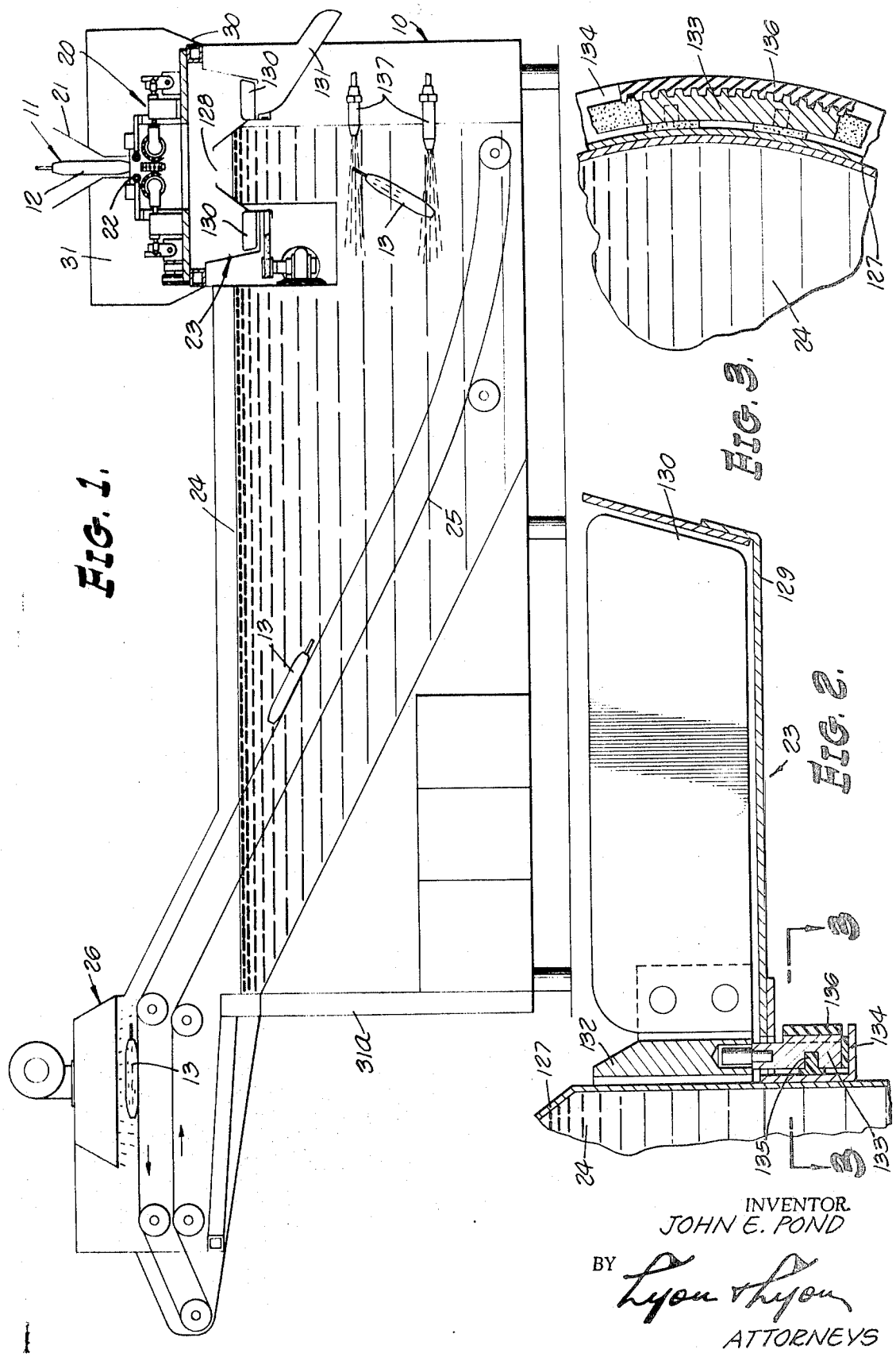
INVENTOR.
JOHN E. POND
BY
Lyon & Lyon
ATTORNEYS

INVENTOR.
JOHN E. POND

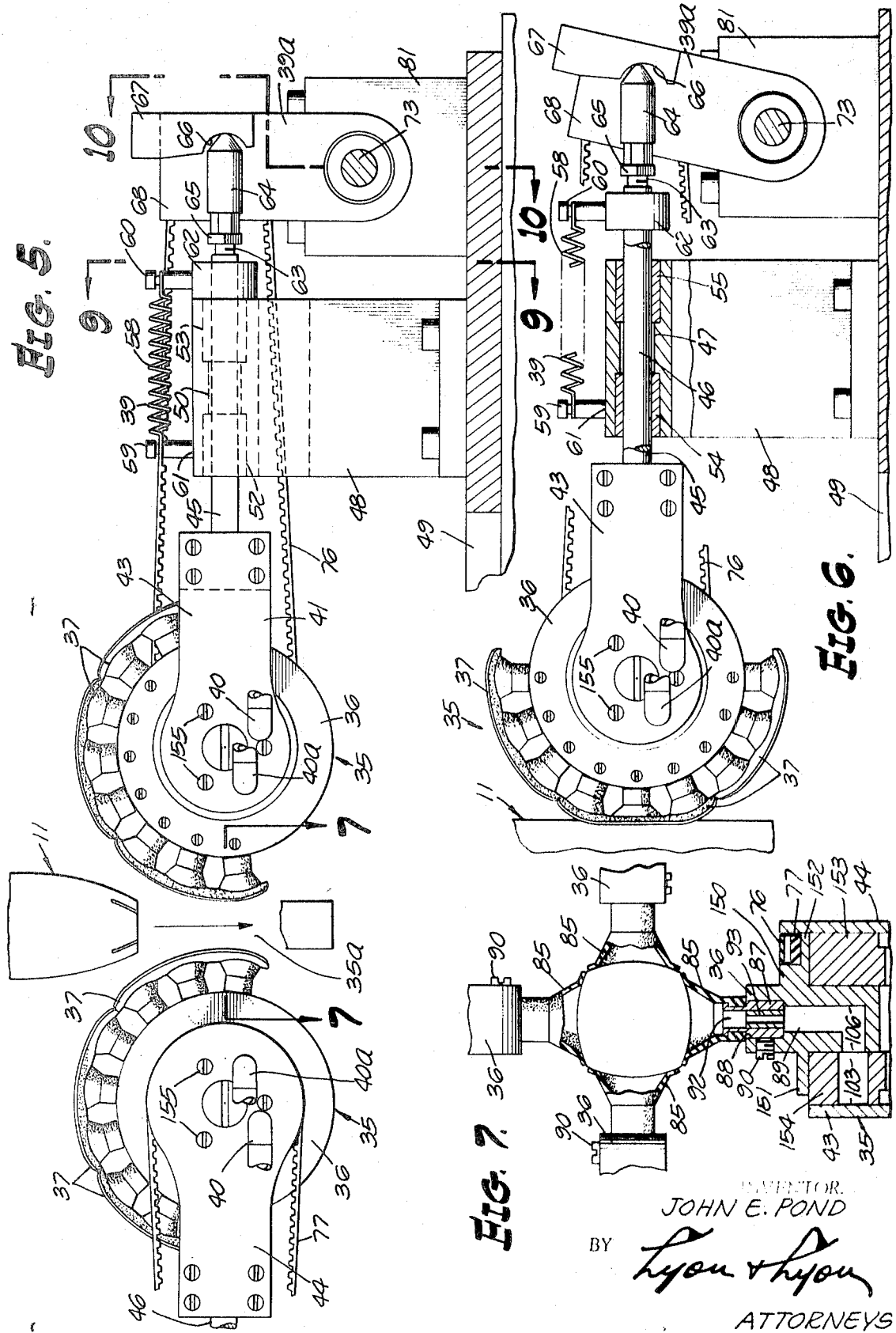

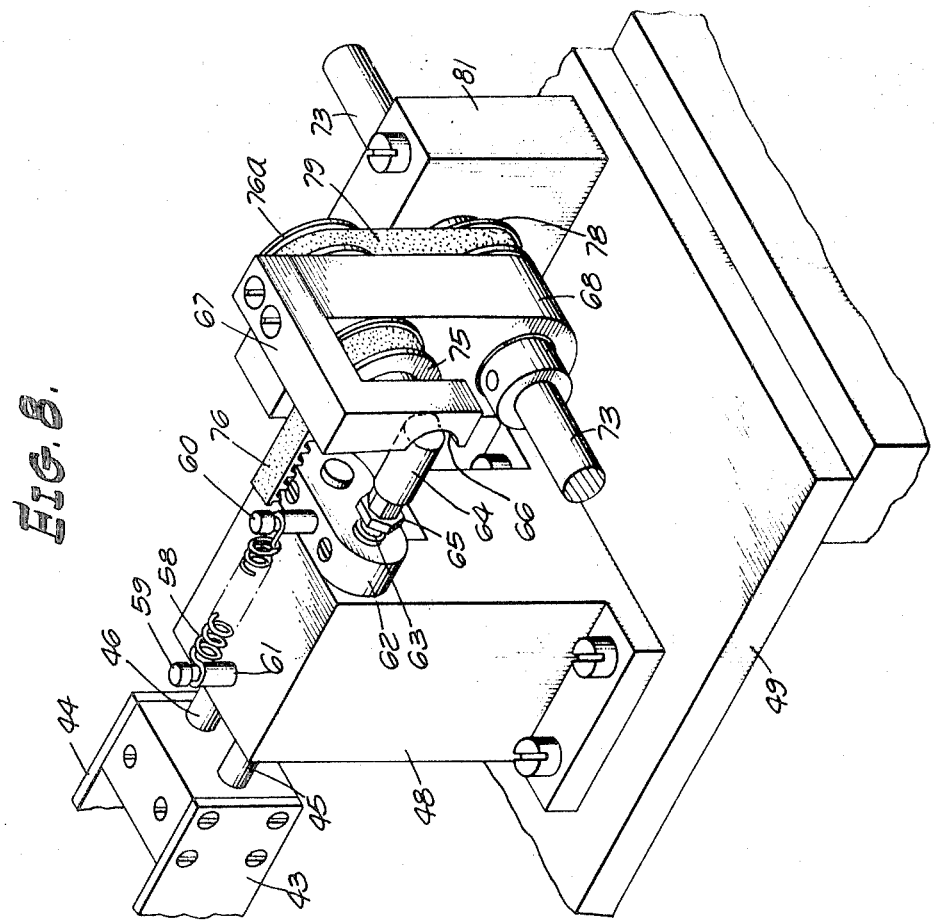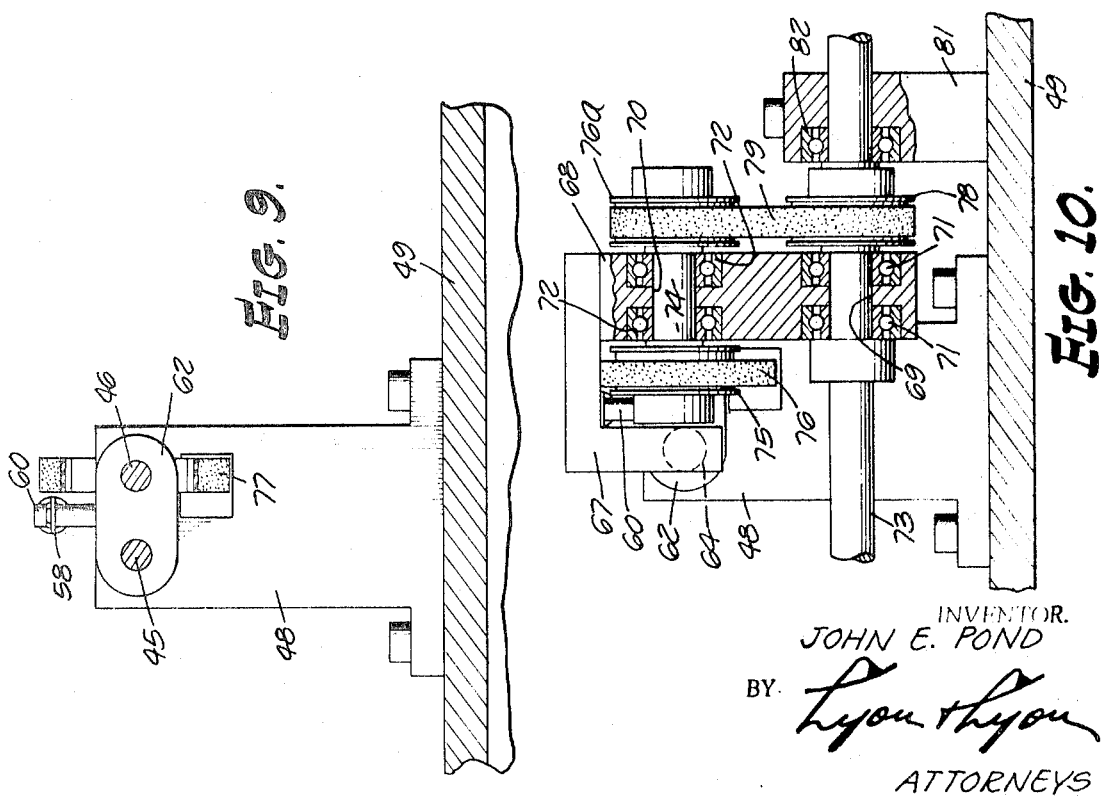

Patented Dec. 14, 1971
3,627,011
9 Sheets-Sheet 5
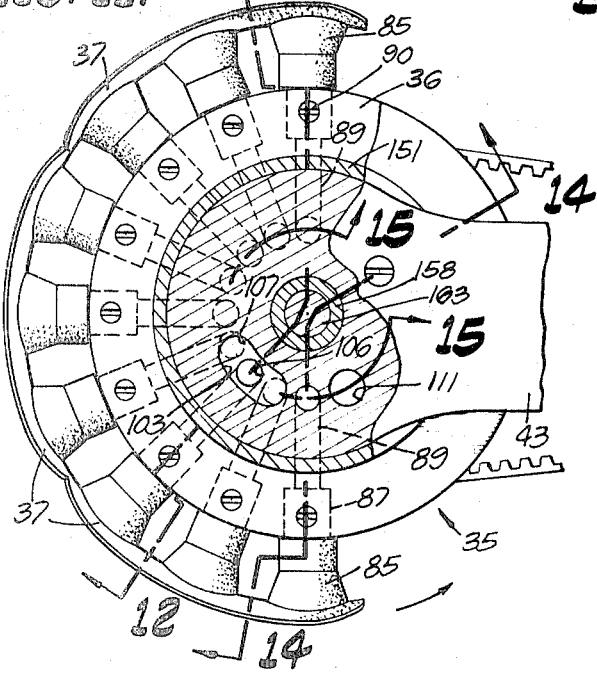
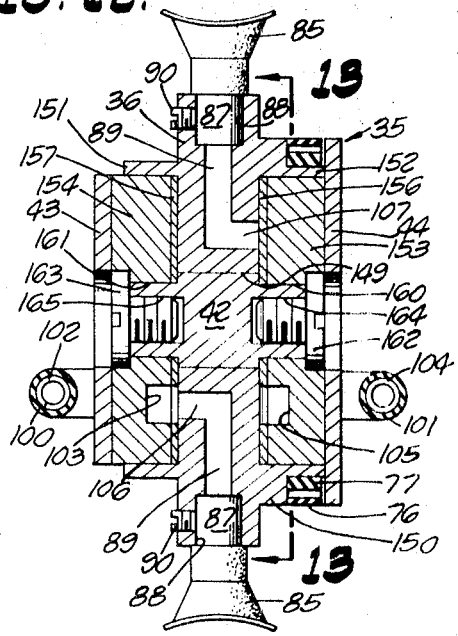
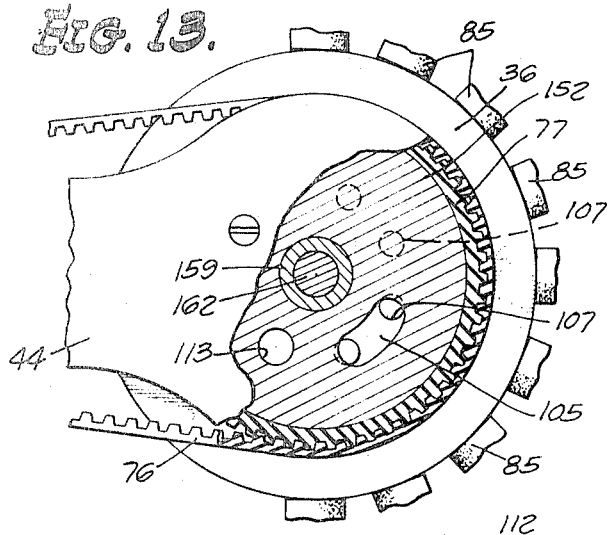
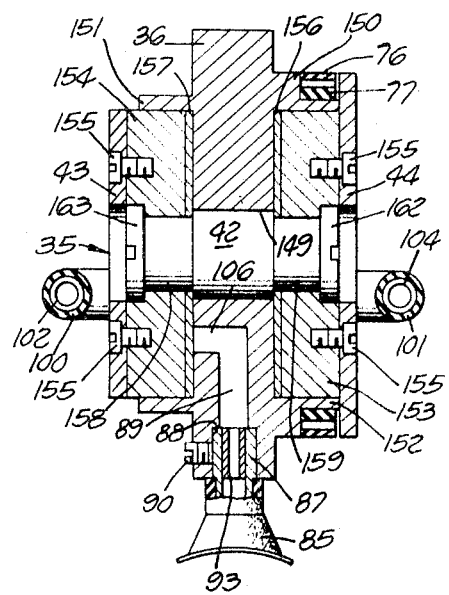
INVENTOR.
JOHN E. POND
BY
Lyon & Lyon
ATTORNEYS INVENTOR.
JOHN E. POND
BY Lyon & Lyon
ATTORNEYS INVENTOR.
JOHN E. POND
BY Lyon & Lyon
ATTORNEYS

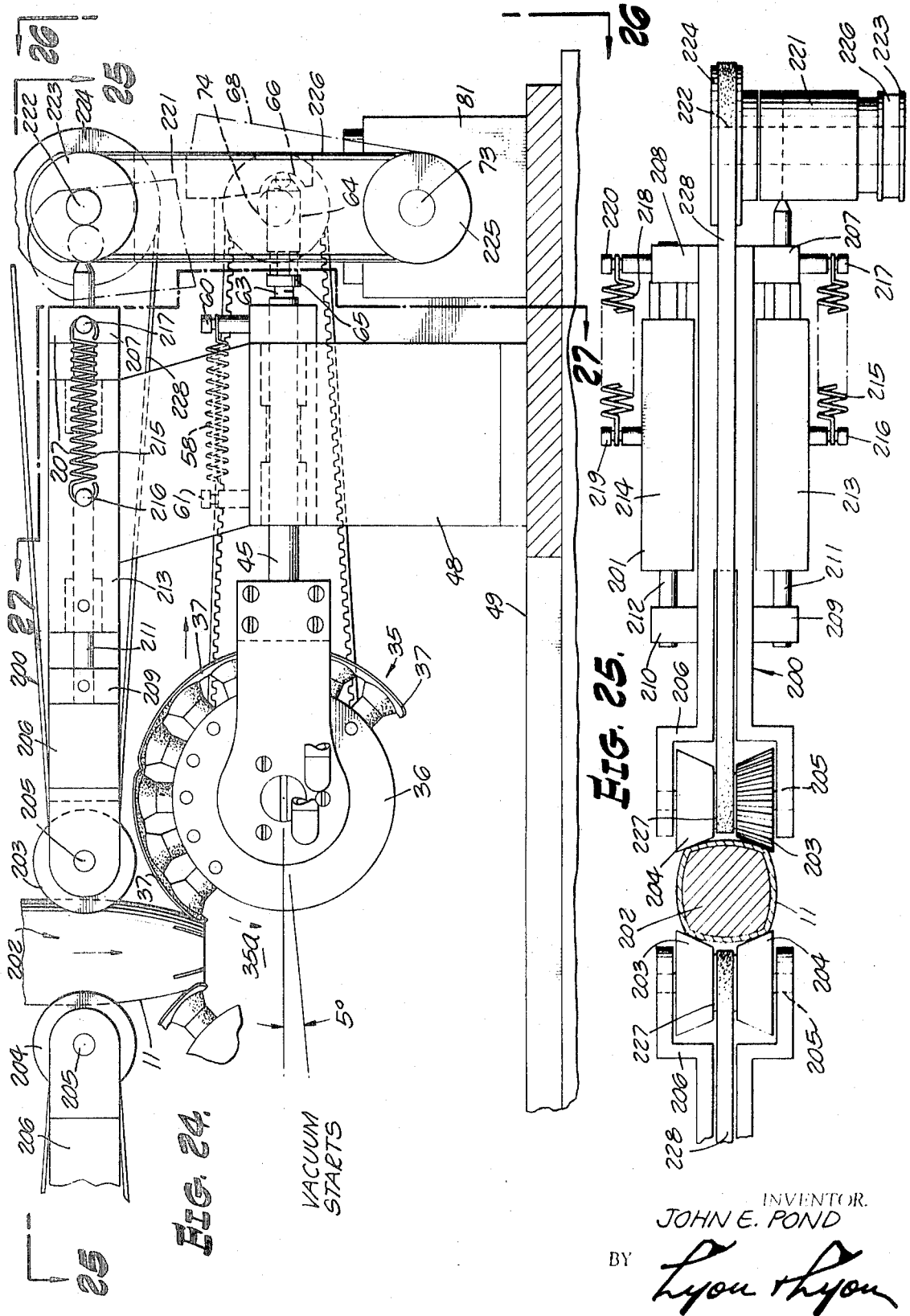

Patented Dec. 14, 1971
3,627,011
9 Sheets-Sheet 9
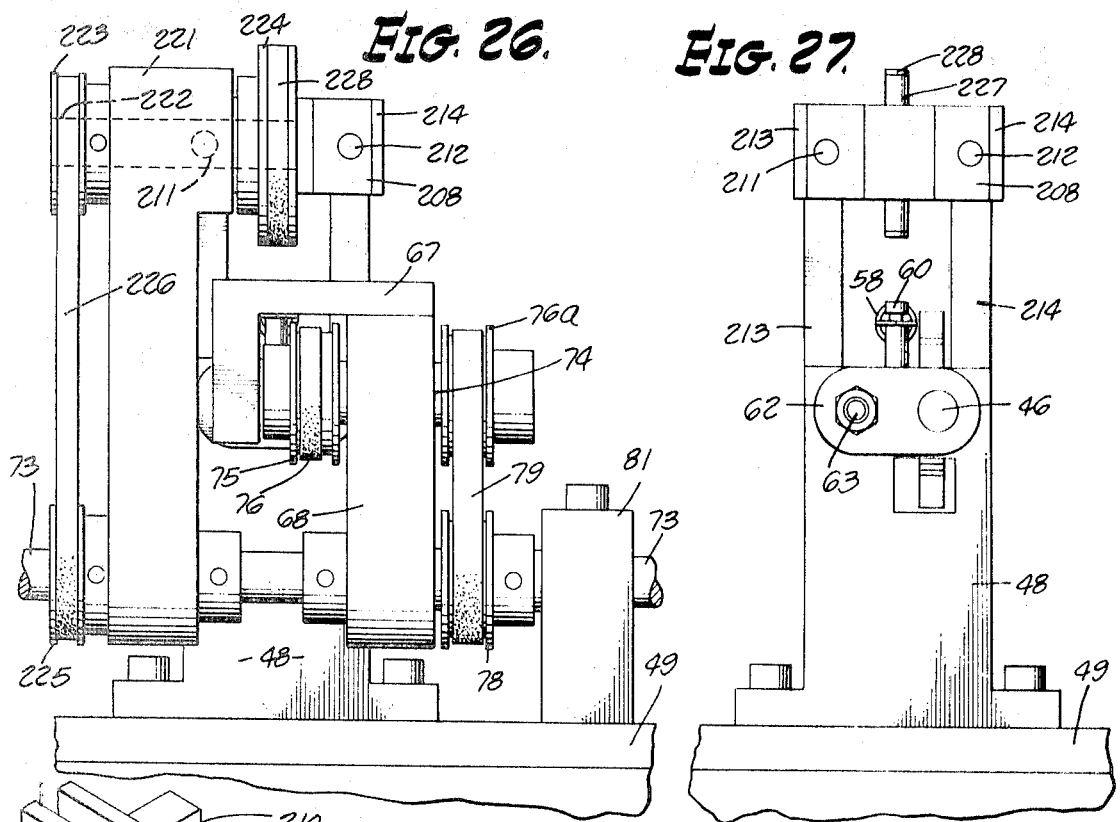
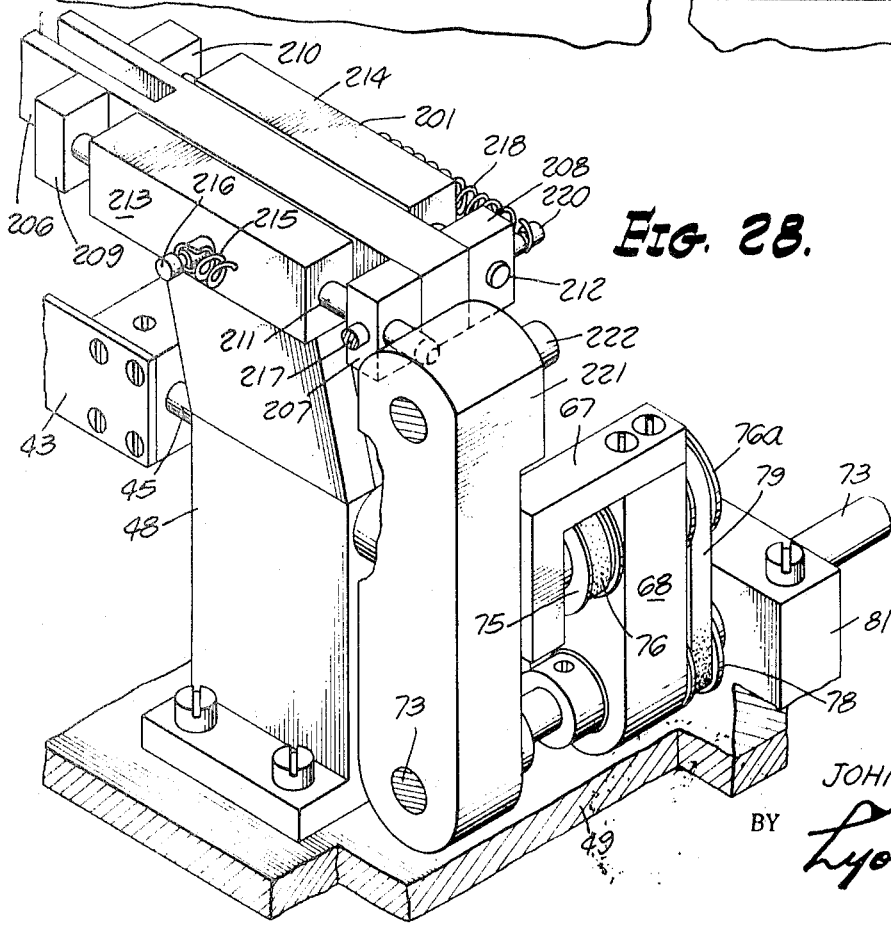
INVENTOR.
JOHN E. POND
BY
Lyon & Lyon
ATTORNEYS

METHOD AND APPARATUS FOR PEELING BANANAS

The invention relates to a fruit processing apparatus and more particularly is related to the automatic removal of the peel from the fruit of a banana.

Bananas have long been a popular food item and their popularity is increasing as various new modes of preparation have been developed. An example of one such mode includes freezing the whole fruit of a peeled banana, coating the fruit with chocolate or the like and mounting it on a stick similar to an ice cream bar. Bananas prepared in this manner are extremely popular items at fairs, carnivals and other recreation spots.

This preparation necessarily includes peeling which when done by hand is a relative simple operation as the peel generally tends to separate into longitudinal segments which are easily removed from the fruit. However, peeling by hand is a relatively slow operation and involves substantial labor when a large number of peeled bananas are desired. Thus, the time and expense in preparing the bananas in this manner has somewhat limited the full commercial development of the product.

Therefore, in this preparation of the banana and normally in any preparation of the banana which includes peeling, automatic removal of the peeling is desirable. However, because of the shape of the banana and the somewhat delicate nature of the fruit automatic removal of the peel from the banana has in the past not been altogether successful. This is particularly true when removal of the peel is attempted while maintaining the fruit in a whole condition.

Therefore, it is a primary object of this invention to provide an apparatus which will automatically remove the peeling from bananas. Another object of this invention is to provide an apparatus which will remove the banana peeling in a quick and efficient manner while maintaining the fruit of the banana in a whole condition. In accordance with this object, the apparatus should be such that it requires a minimum number of unskilled operators.

A further object of this invention is to provide an apparatus which can be used in association with other equipment used to process and prepare bananas. A still further object of this invention is to provide an apparatus which will automatically dispose of the peels once removed from the fruit.

To accomplish these and other objects, the invention briefly includes a peeling mechanism which self-adjusts according to the shape of the banana and which is adapted to engage, grip and pull the peel from the fruit of the banana when the banana passes adjacent to the peeling mechanism. A banana which is first fed into the apparatus by an operator or an automated feed mechanism is properly positioned and oriented within the apparatus with respect to the peeling mechanism which includes a plurality of peeling units. The peel which is sliced longitudinally to assist in the removal of the peel, is generally engaged and gripped between the slices by the peeling units by a plurality of moveable grip members which hold the peel until it is completely removed from the fruit and then release the peel for subsequent disposal. The peeled fruit is passed from the peeling units of the peeling mechanism into a transferring medium to a conveyor belt for further processing. Means are provided to actuate and control the peeling mechanism and the movement of the banana through the apparatus.

Other and further objects and advantages of the invention will be made readily apparent from the accompanying drawings and following detailed description.

IN THE DRAWINGS:

FIG. 1 is a sectional side view of the apparatus illustrating the movement of a peeled banana to the conveyor.

FIG. 2 is a fragmentary side sectional view of the apparatus illustrating a disposal unit.

FIG. 3 is a fragmentary top sectional view of the apparatus taken substantially on the lines 3—3 of FIG. 2.

FIG. 5 is a fragmentary side view of the peeling mechanism illustrating the position of the peeling units prior to engagement with a banana.

FIG. 6 is a fragmentary side view of the peeling mechanism illustrating the adjustment of a peeling unit after it has engaged a banana.

FIG. 7 is a fragmentary top view taken substantially on the lines 7—7 of FIG. 5.

FIG. 8 is a perspective view of a peeling unit illustrating the drive connection unit and the adjustment means for the peeling unit.

FIG. 9 is an end view of a peeling unit taken substantially on the lines 9—9 of FIG. 5.

FIG. 10 is an end view partially in section of a peeling unit taken substantially on lines 10—10 of FIG. 5.

FIG. 11 is a fragmentary side view partially in section illustrating the rotatable member or wheel of a peeling unit which carries the plurality of grip members.

FIG. 12 is a front sectional view of the rotatable member of a peeling unit taken substantially on the lines 12—12 of FIG. 11.

FIG. 13 is a fragmentary side view partially in section illustrating the rotatable member of a peeling unit.

FIG. 14 is a front sectional view of the rotatable member of a peeling unit taken substantially on the lines 14—14 of FIG. 11.

FIG. 15 is a fragmentary sectional view of the rotatable member of a peeling unit taken substantially on the lines 15—15 of FIG. 11.

FIG. 24 is a side view of the peeling unit of an alternative embodiment of the peeling mechanism.

FIG. 25 is a top view of the peeling unit of the alternative embodiment taken substantially on the lines 25—25 of FIG. 24.

FIG. 26 is an end view of the peeling unit of the alternative embodiment taken substantially on the lines 26—26 of FIG. 24.

FIG. 27 is an end view of the peeling unit of the alternative embodiment taken substantially on the lines 27—27 of FIG. 24.

FIG. 28 is a fragmentary perspective view of the peeling unit of the alternative embodiment illustrating the drive connection unit and the adjustment means for the peeling unit.

Figure 4:
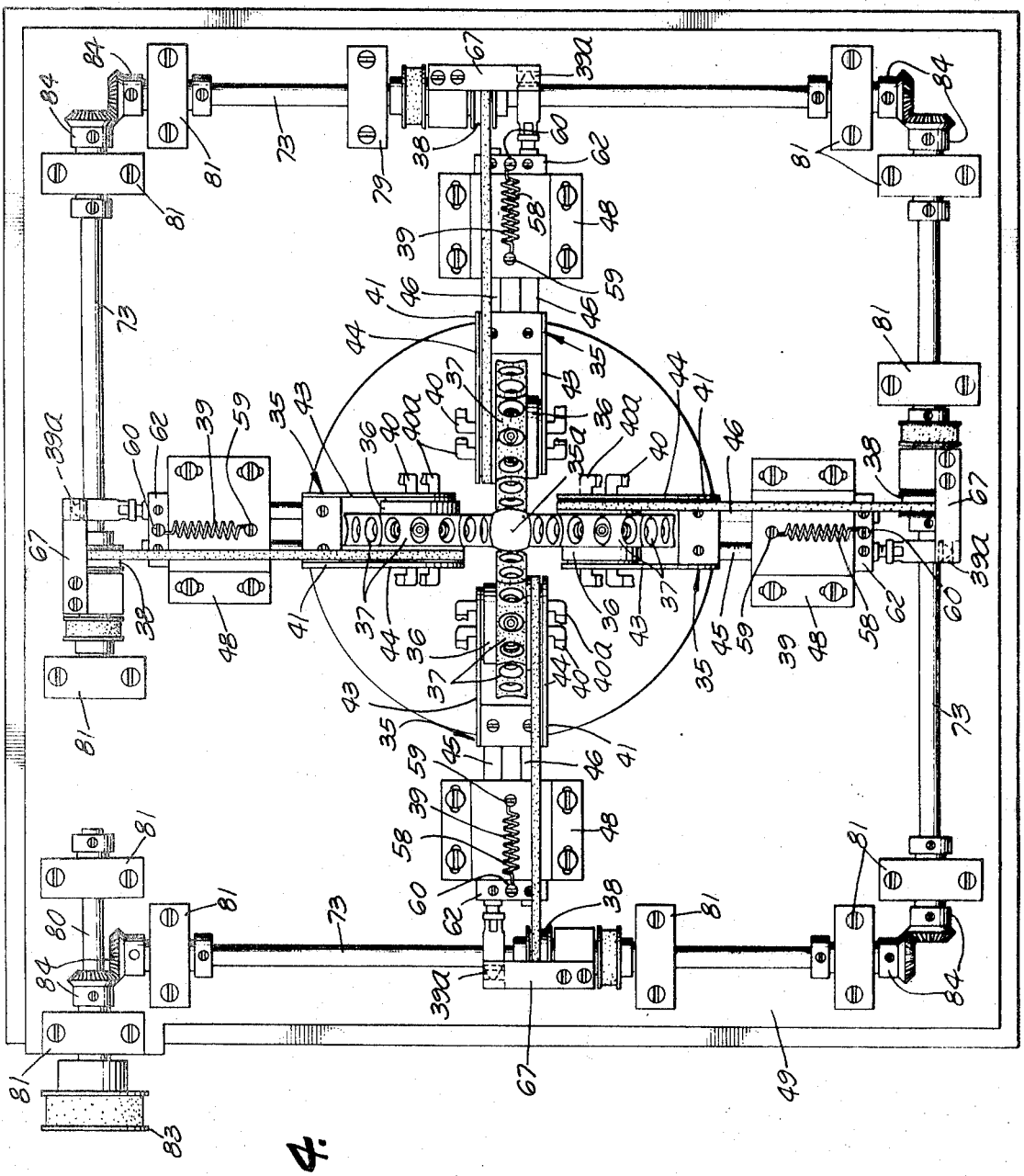
FIG. 4 is a top plan view of the peeling mechanism illustrating the peeling units.
Figure 16:
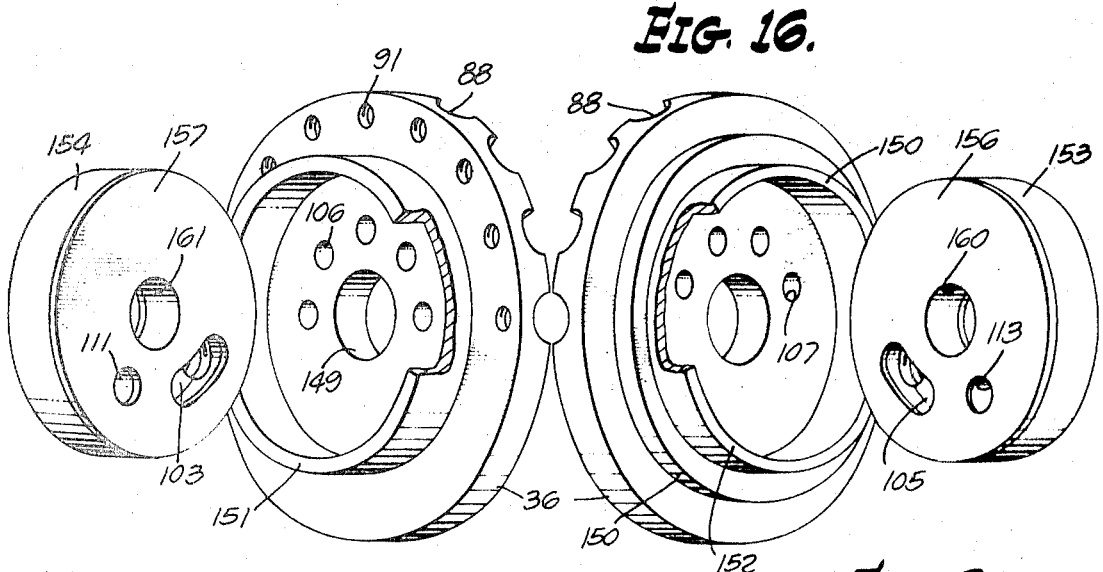
FIG. 16 is an exploded perspective view of the rotatable member of a peeling unit.

Before referring in detail to the drawings, it should be noted that the apparatus as shown in the drawings is generally adapted to be used in the preparation of bananas which are generally coated with an edible substance such as chocolate, frozen and positioned on a stick similar to an ice cream bar. In which case the stick, which is generally rodlike, is shoved axially and centrally into the banana before it is fed into the apparatus with a predetermined length of the stick extending from the banana for holding purposes. The invention, however, is not meant to be limited for use only in this particular process and it will be evident that the invention is useful whenever automatic removal of the peel is desired. As also shown in the drawings, it is generally preferable to first cut one or both ends off the banana before it is fed into the apparatus. In addition, to initiate the peeling of the banana it is preferable that the peel of the banana be sliced longitudinally to divide the peel into segments prior to the time the peel is pulled from the banana.

Referring now to FIG. 1, the apparatus, generally designated 10, includes a peeling mechanism, generally designated 20. A banana 11 with a peel 12 is fed into the feed hopper 21 and then passed through guide means 22 which orient and position the banana longitudinally and adjacent to the peeling mechanism 20. After the banana peel has been completely removed from the banana fruit 13 by the peeling mechanism 20 the peel is dropped into a disposal unit 23 and the peeled fruit is released into a liquid medium or a bath 24 which allows the peeled fruit to be guided to a conveyor unit 25 without damaging the fruit. The conveyor unit 25 transports the peeled banana from the medium 24 to a drying unit 26 where the banana is dried and then delivered for further processing such as freezing and coating.

Figure 22:
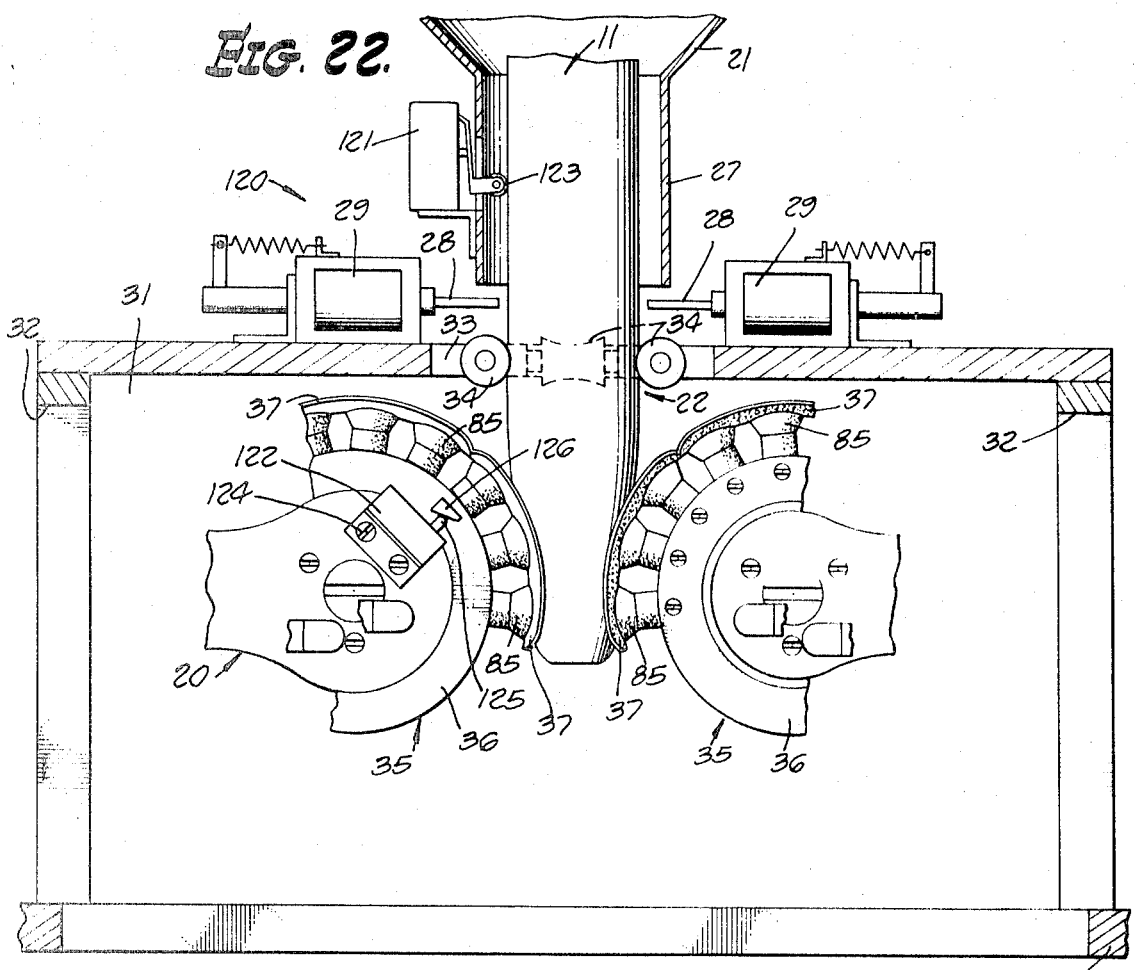
FIG. 22 is a fragmentary side view of the apparatus illustrating the means for feeding and guiding a banana into engagement with the peeling units.
Figure 23:
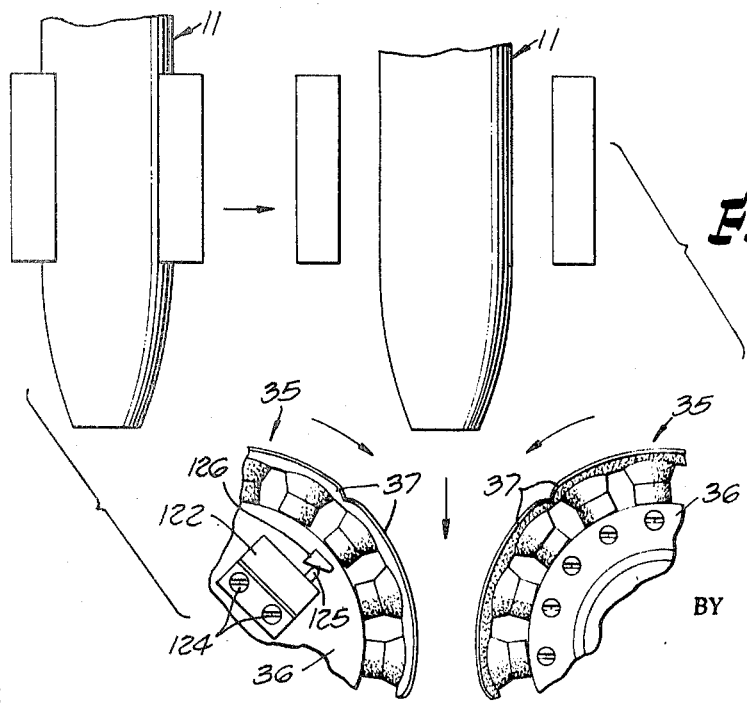
FIG. 23 is a fragmentary side view illustrating the position of the rotatable members when a banana is released for engagement with the peeling units.

As best seen in FIG. 22, the feed hopper 21 includes a feed tube 27 which maintains the banana 11 in a generally vertical position for entrance through the guide means 22. Adjacent the lower end of the feed tube 27 is gate 28 against which the lower end of the banana 11 is adapted to rest. The gate 28 is opened by solenoids 29 and the opening of the gate 28 is automatically controlled and depends in parts on the position of a proceeding banana in the apparatus. It is evident that the apparatus is adapted to operate continuously and the gate 28 acts to control and synchronize the movement of each banana 11 fed into and through the apparatus with respect to the peeling mechanism 20. The timed opening of the gate 28 along with other control features of the invention will be described later in detail.

A housing 30, which includes a peeling chamber 31, supports the peeling mechanism 20 and encloses the disposal unit 23. As seen in FIG. 1, the housing 30 is positioned generally above the conveyor 25 and on a container 31a which holds the medium 24. The peeling chamber 31 includes a plurality of side openings 32 into which the peeling mechanism 20 partially extends and a top opening 33 which is positioned adjacent the gate 28 through which the banana 11 passes.

The guide means 22 includes a plurality of guide rollers 34, preferably four, which are rotatably mounted in spaced relationship around the circumference of the opening 32. The guide rollers 34 are adapted to receive the banana 11 after the gate 28 is opened. As shown in FIG. 22, the guide rollers 34 permit the banana 11 to pass longitudinally through the guide rollers 34 into engagement with the peeling mechanism while maintaining the banana 11 in a substantially vertical position.

The peeling mechanism 20 in the preferred embodiment shown in the drawings comprises four identical units 35, each of which is mounted on the housing 30; one on each side of the peeling chamber 31. Each unit 35 partially extends into the peeling chamber 31 through one of the side openings 32 and is adapted to engage the peel of a banana which has passed through the gate 28, opening 32 and guide rollers 34. As shown in the drawings, each unit 35 is positioned at right angles to the adjacent units and together they define a passage 35a through which the banana 11 passes after the gate 28 is opened. Thus, as the banana 11 moves through the passage 35a it is engaged on four sides by the peeling units 35.

Each unit 35, as seen best in FIGS. 4 through 14, generally includes a rotatable member or wheel 36 having a plurality of grip members 37, rotatable means 38 to rotate the wheel 36 in a generally vertical plane parallel to the longitudinal axis of the banana 11, biasing means 39 and adjustment means 39a which permit limited horizontal movement of the wheel 36 with respect to the longitudinal axis of the banana 11 when it moves through the passage 35a, and actuating means 40 and 40a which actuate the gripping and release of the peeling by the grip members 37.

The rotatable member or wheel 36 which is located generally at the so-called forward or engaging end of each unit 35 extends into the peeling chamber 31 and is rotatably mounted to a bifurcated wheel support 41 on a horizontal axis or shaft 42 which extends between the two parallel sides 43 and 44 of the support 41. The wheel support 41 is connected to a pair of cylindrical shafts 45 and 46. The shafts 45 and 46 are mounted for axial movement in a support member 48 which is fixably mounted to a base plate 49 on the housing 30. The support member 48 includes a pair of bores 50 and 47 through which the shafts 45 and 46 extend. Mounted in the bore 50 are bushings 52 and 53 adjacent the openings of the bore 50 on which the shaft 45 slides axially. Mounted in the bore 47 are bushings 54 and 55 adjacent the openings of the bore 47 on which the shaft 46 slides axially.

The biasing means 39 comprises a spring 58 which is supported horizontally between a pair of bolts 59 and 60. Bolt 59 is mounted on the support member 48 at 61 to connect one end of the spring 58 to the support member 48 and the bolt 60 is mounted to a collar member 62 which is secured to the ends of both shafts 45 and 46 which extend beyond the backside of the support member 48. The spring 58 acts on the collar member 62 to maintain the shafts 45 and 46 in a normally forward position as shown in FIG. 5, however, when the grip members 37 engage the banana, pressure is applied to the spring 58 through the shafts 45 and 46 which permits the shafts 45 and 46, wheel support 41 and wheel 36 to move rearwardly, with the shafts 45 and 46 moving axially in the support member 48 on the bushings. Forward movement of the shafts 45 and 46 and the connecting parts is limited by the collar member 62 engaging the backside of the support member 48. The biasing means 39 thus maintains a constant pressure on the banana 11 during engagement of the banana 11 by the grip member 37, but provides for adjustment of each unit 35 as the banana 11, which is larger in diameter in the middle than at the ends, passes between them thereby avoiding damage to the fruit 13.

As best shown in FIGS. 5 and 6, the shaft 45 is longer than the shaft 46 and the end 63 of the shaft 45 extends beyond the collar member 62 and is externally threaded. Screw threaded onto the end 63 is an axially adjustable cam follower member 64 with a locknut 65 maintaining the cam follower member 64 in the desired axial position. The cam follower member 64 engages a cam track 66 on an L-shaped arm 67 which is rigidly secured to the upper end of a link member 68. The link member 68, as seen best in FIG. 10, includes a lower bore 69 and an upper bore 70, each of which carries a pair of bearing members 71 and 72, respectively. The link member 68 is pivotally mounted on a horizontal drive shaft 73 which extends through the lower bore 69 and is journaled on the pair of bearing members 71 positioned within the bore 69. Positioned for rotation within the upper bore 70 and on the pair of bearing members 72, is a horizontal shaft 74 which connects a pair of pulley members 75 and 76a positioned on each side of the link member 68. Pulley member 75, positioned between the L-shaped arm 67 and the link member 68, is adapted to rotate in a vertical plane parallel to the vertical plane in which the wheel 36 rotates. A notched timing belt 76, which prevents slippage, preferably of a flexible material such as rubber, operably connects the pulley member 74 to a toothed inner wheel 77 which is secured to one side of the wheel or rotatable member 36, as shown in FIG. 13. Pulley member 76a on the other side of the link member 68 is in parallel alignment with the pulley member 78 which is connected to the drive shaft 73. A belt 79 operably connects the pulley members 76a and 78.

As seen in FIG. 4, the apparatus includes four drive shafts 73 and a main drive shaft 80. All four of the drive shafts 73 and the main drive shaft 80 are mounted on a plurality of support members 81, each of which includes bearing members 82 to permit rotational movement of the drive shafts. The support members are each rigidly secured to the base plate 49. The main drive shaft 80 is connected to a main drive pulley 83 which is belt driven by a motor (not shown). A series of bevel gears 84 on each of the drive shafts 73 and on the main drive shaft 80 interconnect all the drive shafts 73 which are in turn operably connected to the main drive shaft 80 whereby power supplied by the motor to the pulley 83 is transmitted equally through the main drive shaft 80 to the drive shafts 73 to all of the peeling units 35.

Figure 17:
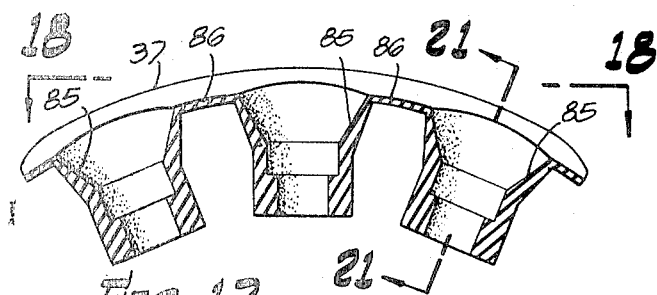
FIG. 17 is a side sectional view of several grip members.
Figure 20:
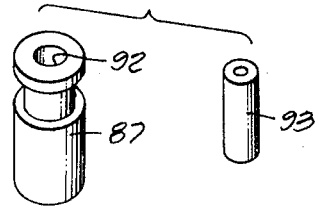
FIG. 20 is a perspective exploded view of the connector which secures each grip member to the rotatable member of a peeling unit.
Figure 18:
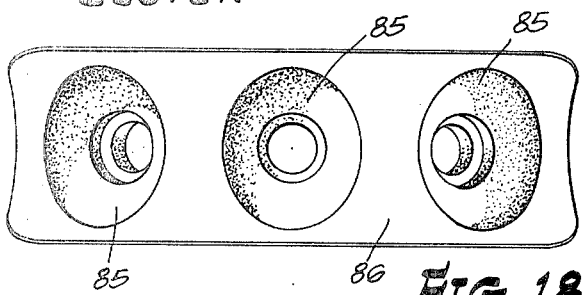
FIG. 18 is a top view of several grip members taken substantially on the lines 18—18 of FIG. 17.
Figure 21:
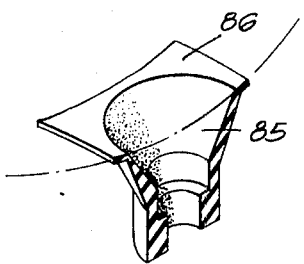
FIG. 21 is a sectional view of a grip member taken substantially on the lines 21—21 of FIG. 17.
Figure 19:
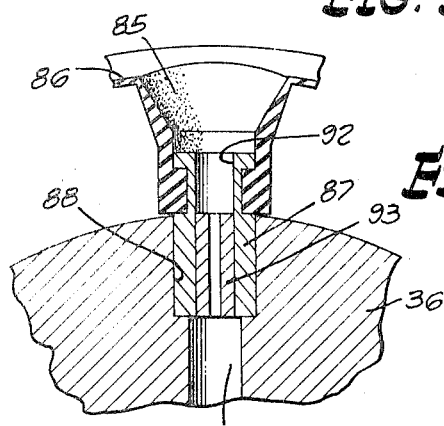
FIG. 19 is a side sectional view illustrating a grip member secured to the rotatable member of a peeling unit.

The grip members 37, comprise a plurality of vacuum or suction cups 85 positioned around a portion of the perimeter of the wheel 36. Preferably, as shown in FIGS. 5-6, and 11, the cups 85 extend 180° around the perimeter of the wheel 36. While the number of cups 85 can be varied, in the preferred embodiment shown there are nine cups spaced equally apart. As shown in FIGS. 17-19, the cups 85 are arranged in groups of three, with each group of cups 85 connected by a web 86. The cups 85 are of a flexible material to provide an airtight seal when a cup 85 is in complete engagement with the peeling of the banana 11. In addition the flexible nature of the cups 85 avoids damage to the fruit 13 of the banana 11 during removal of the peel. Each cup 85 abuts the surface of the wheel perimeter and is connected to a sleeve 87. Each sleeve 87 is positioned within an enlarged portion 88 of a passage 89 in the interior of the wheel 36. Each cup 85 and connecting sleeve 87 are secured to the wheel 36 by set screws 90 which extend through threaded openings 91 in the wheel 36. Each sleeve includes a central bore 92 which provides communication between the passage 89 and the interior of the cup 85. The size of the bore 92 is reduced by a tubular member 93 which fits concentrically within the sleeve 87.

As seen best in FIGS. 11 through 16, the wheel member 36 includes a central bore 149 through which the shaft 42 extends and a pair of cylindrical flanges 150 and 151 on each side of the wheel member 36. The flange 150 includes a decreased outer diameter portion 152 on which is secured the toothed wheel 77. The inner diameter of each flange 150 and 151 is identical and these flanges each are adapted to receive one of two identical bearing members 153 and 154. The bearing members 153 and 154 extend inwardly from the parallel sides of the support 41 and are connected to the sides by screws 155 which are received by threaded openings which are located on one side of the bearing members. Included on the other sides or inner sides of the bearing members are bearing discs 156 and 157 which are adapted to abut the sides of the wheel member 36 and reduce friction. The discs 156 and 157 are preferably impregnated nylon.

The bearing members 153 and 154 are also connected to the shaft 42, the ends of which are reduced in diameter at 158 and 159. The smaller diameter ends 158 and 159 of the shaft 42 extend into central bores 160 and 161, respectively, in the bearing members. The shaft 42 is secured to the bearing members 153 and 154 by screws 162 and 163 which are received by internally threaded bores 164 and 165 in the ends 158 and 159, respectively, of the shaft.

The means 40 to actuate the gripping of the peel of the banana by grip members 37 includes a pair of vacuum hoses 100 and 101. Vacuum hose 100 is connected to the wheel support 41 by a hollow coupling 102 which is screw threaded into the side 43 and the bearing member 154 and is in communication with a generally crescent-shaped vacuum groove 103. Vacuum hose 101 is connected to the wheel support 41 by a hollow coupling 104 which is screw threaded into the side 44 and the bearing member 153 and is in communication with a generally crescent-shaped vacuum groove 105. The vacuum grooves 103 and 105 are normally blocked by the sides of the wheel 36, however, vacuum passages 106 and 107 which are alternatively provided for each cup 85 and which are in communication with passages 89 and at right angles to the passages 89 provide communication between the hoses 100 and 101, respectively, and the interior of the cups 85 through the passages 89. When the lead cup 85 of the first group of three connected cups 85 on the constantly rotating wheel 36 has rotated to a position which is approximately horizontal with respect to the vertically oriented banana 11, the end of the banana 11 passes through the gates 28 and the guide rollers 34 into engagement with the first group of cups 85. The vacuum groove 103 is so arranged that alignment of the lead vacuum passage 106 with the vacuum groove 103 begins after engagement between the first group of cups 85 and the banana 11 and when the lead cup 85 has rotated slightly downward from its position of initial engagement with the banana 11 to a position approximately 5° below the horizontal. Likewise, alignment of the lead vacuum passage 107 with the vacuum groove 105 begins when the next succeeding cup 85 of the first group of cups 85 has rotated downward from its position of initial engagement with the banana 11 to a position approximately 5° below the horizontal. Alignment of a vacuum passage, either 106 or 107, with the respective vacuum groove will start the sucking of air from the interior of the cup associated with the aligned vacuum passage and this will cause that cup to grip and hold the peeling.

The two vacuum source system with the two vacuum grooves 103 and 105 providing suction alternately to the cups 85 when they are in engagement with the banana peel 12 insure a complete grip of the peel when there is a partial loss of vacuum to one of the cups 85 gripping the banana peel 12 when another cup 85 being provided with suction from the same vacuum hose first comes into engagement with the banana peel 12, but before there is an airtight seal to create a vacuum between that later engaging cup 85 and the banana peeling. The reason for this is because there will be no loss of vacuum to a third cup 85 completely engaging and gripping the banana peel which is adjacent to and in between the other two cups engaging the peel and which is the only cup operating off the other vacuum hose at that instance. It should be further noted, that either vacuum groove 103 or 105 operate to provide suction to a cup 85 until it has moved approximately 57°.

The release actuating means 40a includes a pair of pressure hoses 108 and 109 which operate to blow air or another suitable gas through the interior of each cup 85 at a predetermined interval to remove the banana peel from each cup 85. Pressure hose 108 is connected to the wheel support 41 by a coupling 110 which is screw threaded into side 43 and bearing member 154 and is in communication with an air passage 111. Pressure hose 109 is connected to the wheel support 41 by a coupling 112 which is screw threaded into side 44 and bearing member 153 and is in communication with an air passage 113. The air passages 111 and 113 are normally blocked by the sides of the wheel 36, however, passages 106 and 107 when in alignment with the air passages 111 and 113, respectively, provide communication of the air between the hoses 108 and 109, respectively, and the interior of the cups 85 through the passages 89. As shown in FIGS. 11 through 13 the air passages 90 and 92 are so arranged to blow air through each cup 85 shortly after suction of air from the interior of the cup has ceased.

The control means generally designated 120, as shown in FIG. 22, include a pair of sensor switches 121 and 122. Sensor switch 121 is secured to the feed tube 27 and includes a contact switch 123 which extends into the feed tube 27 as shown in FIG. 22 and is adapted to engage the banana 11 when it has been placed in the feed tube 27. Sensor switch 121 synchronizes the operation of the motor which drives each drive shaft 73 thereby causing each wheel 36 to rotate.

Sensor switch 122, as shown in FIG. 22 is mounted on one side of the wheel support 41 by screws 124 and includes a switch 125 which is adapted to contact a terminal 126 on one side of the wheel 36 when the wheel is rotated. Sensor switch 122 operates the solenoids 29 which open the gate 28. The terminal 126 is so positioned that the gate 28 will open to drop the banana 11 into the passage 35a and into engagement with the first group of cups 85 when those cups are at a predetermined position as discussed before.

The disposal unit 23, as seen best in FIGS. 2 and 3, which receives the released banana peel is positioned in the housing generally beneath the peeling chamber 31 and the four peeling units 35. The disposal unit 23 includes a conical guide wall 127 which has a central opening 128 in alignment with the passage 35a which allows the peeled banana to pass into the medium 24. The guide wall 127 guides the banana peel 12 into a circular trough 129. A plurality of paddles 130 positioned in the trough 129 are adapted to move through the trough and push the bananas peeling dropped into the trough into a discharge chute 131.

The paddles 130 are connected to a support ring 132 which is positioned around the inner wall of the trough 129. The support ring is secured to a timing pulley 133 which is slidably mounted on a track 134. Teflon bushing pads 135 support the timing pulley 133 on the track 134. A toothed rubber pulley 136 driven by a motor 137 rotates the timing pulley 133 and moves the paddles 130 through the trough 129.

As shown in FIG. 1, jets 137 located on the container 31a below the opening 128 and above the conveyor means 25, act through the medium 24 to guide the peeled banana 13 onto the conveyor means 25.

In the alternative embodiment of the invention, shown in FIGS. 24–28, the apparatus is identical except the peeling mechanism 20 comprises only two identical peeling units 35 which are positioned opposite each other to define the passage 35a. Each peeling unit 35 is additionally provided with a feed mechanism, generally designated 200. The feed mechanism 200 also comprises two identical feed units 201 which are positioned opposite each other and which define a second passage 202 which is above the passage 35a.

Since the feed units 201 are identical only one will be described in detail to avoid duplication. Included on the feed unit 201 are a pair of rollers 203 and 204, each of which are mounted on a common axis 205. The rollers 203 and 204, are each tapered inwardly to conform to the shape of the banana 11, as shown in FIG. 25, and the peripheral surface is serrated for friction purposes. The axis 205 extends between and is rotatably mounted on a bifurcated support 206. At the rear end of the support 206 are a pair of flange members 207 and 208 which extend out from each side of the support 206. A second pair of flange members 209 and 210 positioned forward of and in alignment with the other flange members 207 and 208 also extended out from each side of the support 206. Between the flange members 207 and 209 is mounted a shaft 211 and between the flange members 208 and 210 is a shaft 212, each of which is slidably mounted for axial movement in the respective sleeve members 213 and 214 which are in turn rigidly secured to the top of the support member 48 of the peeling unit 35. The sleeve members 213 and 214 are positioned along each side of the bifurcated support 206. A spring member 215 extends between a pair of outwardly extending posts 216 and 217, one of which is mounted to the sleeve member 213 and with the other post mounted to the rear flange member 207. A second spring member 218 extends between a pair of outwardly extending posts 219 and 220, which are mounted, respectively, to the sleeve member 214 and the rear flange member 208.

The shaft 211 extends beyond the rear flange 207 and engages the upper end of a link member 221 which is pivotally mounted at its lower end to the drive shaft 73. The link member 221 carries at its upper end a horizontal axis 222 which connects a pair of pulley members 223 and 224 mounted on each side of the link member 221. Pulley member 223 is in parallel alignment with a drive pulley 225 in the shaft 73 and a belt 226 transmits the rotation of the shaft 73 and the pulley 225 to the pulley member 223. The pulley member 224 is in parallel alignment with a pulley 227 positioned between the rollers 203 and 204 and is connected to the axis 205. A belt 228 operably connects the pulley member 224 and the pulley 227 whereby the rollers are rotated at the same rate as the drive shaft 73.

As the banana enters the passage 202 the constantly rotating rollers 203 and 204 drive or feed the banana 11 on through the passage 202 and into and through the passage 35a. Axial movement of the shafts 211 and 212 permit the feed unit 201 to adjust to the varying shape of the banana 11 and the pivotally mounted link member 221 prevents slack in the belt 228. The spring members 215 and 218 cause the rollers 203 and 204 to apply a relatively constant pressure on the banana 11 as it moves through the passage 202.

In the operation of the preferred embodiment, a banana 11 is fed into the feed hopper 21 and the feed tube 27 where it engages the switch 123 of the sensor switch 121. The sensor switch 121 synchronizes the motor which causes the wheels 36 of the peeling mechanism to rotate. When the terminal 126 contacts the switch 125 of the sensor switch 122 the gate 28 is caused to open and drop the banana through the opening 33 and through the guide rollers 34 into the peeling chamber 31 and into the passage 35a between the peeling units 35. As the end of the banana 11 moves into the passage 35a it is engaged on four sides by the first group of cups 85 on each of the peeling units 35. The contact between the cups 85 and the peel 12 first occurs when the cups 74 are approximately at an imaginary horizontal line parallel to the axes of the shafts 45 and 46. The lead cup 85 on each peeling unit 35 which operates off the vacuum hose 100 is adapted to first contact the peel 12. After contact first occurs the passage 106 of the lead cup 85 contacting the peel 12 moves into alignment with the vacuum groove 103 and air is sucked from the interior of that cup 85. As the lead cup 85 in contact with the peel continues downward, the pressure created by the biasing means produces an airtight seal between the lead cup 85 and the peel 12 and continued sucking causes a vacuum in the interior of the lead cup 85 which in turn causes the lead cup 85 to firmly grip the peel 12.

Continued downward rotation of the lead cups 85 gripping the peel 12 moves the lead cups 85 away from the fruit 13 of the banana 11 and with the lead cups 85 still gripping each segment of the peel 12 pulls the segments from the fruit 13. This downward rotation of the lead cups 85 gripping the peel 12 also causes the banana to move further down into the passage 35a between the peeling units 35. The tapered shape of the banana 11, being generally wider at the middle, forces the wheels 36 on each peeling unit rearwardly thereby enlarging the passage 35a to permit continued downward movement of the banana without damage to the fruit 13.

The wheel 36 continues to rotate with the second cup 85 of the first group of cups 85 on each peeling unit 35 engaging the peel 12. This second cup 85 which is adjacent to the lead cup operates off the vacuum hose 101 and as the passage 107 of that cup moves into alignment with the vacuum groove 105 air is sucked from the interior of that cup. When this cup rotates downward into full engagement with the peel 12 there is an airtight seal produced between the cup and the peel 12 and a vacuum is created in the interior of the cup to cause that cup to firmly grip the peel. At this instance two cups 85 on each peeling unit 35 are firmly gripping the peel. Continued rotation of the wheels 36 forces additional cups 85 on each gripping unit 35 to firmly grip the peel 12 and then, as the wheel 36 continues to rotate and the cups move away from the fruit of the banana, pull the segments of the peel away from the fruit until the peel 12 is finally completely removed at which time the fruit drops through the opening 104 and into the bath 24.

As a cup 85 on each peeling unit 35 which is gripping the peel continues to rotate, the passage 106 or 107 associated with cup moves out of alignment with the respective vacuum groove and sucking is discontinued. However, the cup 85 still grips the peel 12 because at least a partial vacuum remains in the interior of the cup. That cup continues to move however, and shortly after sucking is discontinued the passage 106 or 107 associated with the cup moves into alignment with the respective air passage 111 or 113 and air from the airhose is blown into the interior of the cup to remove the peel from that cup. This continues until the segments are blown from the last cups 85 to grip the peel on each peeling unit at which time the peel segments drop into the trough 105 of the disposal unit 23 where they are subsequently moved into the chute 107.

The fruit of the banana 11 after being dropped into the path 24 is guided by the jets 114 onto the conveyor 25. The conveyor 25 transfers the fruit 13 from the bath 25 to a drying unit 26 and then past the drying unit for further processing.

The alternative embodiment operates in the same manner, except when the banana drops through the gates 28 it first contacts the rollers 203 and 204 on each feeding unit 201 which in turn drive the banana 11 through the passage 35a. In addition, the position of the lead cups 85 when they first contact the banana 11 are substantially above the imaginary horizontal line heretofore mentioned, however, alignment of the passages 106 and 107 with the respective vacuum grooves 103 and 105 and suction still does not begin until the cups have rotated downward to a position approximately 5° below the imaginary horizontal line.

This invention provides an apparatus which automatically removes the peel from a banana and delivers the peeled fruit in a whole condition. The apparatus operates continuously to peel bananas quickly and efficiently and requires a minimum number of operators.

I claim:

1. An apparatus for removing the peel from the fruit of a banana, comprising:
   a peeling mechanism, having a plurality of peeling units, said peeling units defining a passage between them through which the banana is adapted to pass longitudinally;
   grip members on each said peeling unit adapted to engage and grip the sides of the peel as the banana moves through said passage; and
   means to move said grip members on each side peeling unit gripping the peel away from the fruit of the banana whereby the peel is separated into longitudinal segments with each peeling unit pulling a segment from the fruit to completely remove the peel from the fruit.

2. The apparatus of claim 1 wherein each said peeling unit includes vacuum means adapted to suck air during a predetermined interval from said grip members engaging the peel to create a vacuum between said grip members and the peel thereby causing said grip members to firmly grip the peel.

3. The apparatus of claim 1 wherein means are provided to release the segments removed from the fruit from said grip members.

4. The apparatus of claim 3 wherein said release means includes air means adapted to blow air during a predetermined interval through said grip members gripping the peel to blow the peel from said grip members.

5. The apparatus of claim 1, wherein each said peeling unit includes a wheel member, said grip members mounted to said wheel member and said wheel member adapted to rotate in a plane parallel to the longitudinal axis of the banana when the banana passes through said passage to move said grip members first into engagement with the peel and then away from the fruit of the banana in said passage.

6. The apparatus of claim 5, wherein said grip members mounted to said wheel extend 180° around the periphery of said wheel.

7. The apparatus of claim 5, wherein timing means are provided whereby the banana is adapted to pass into said passage and into contact with some of said grip members when said grip members are in a predetermined position.

8. The apparatus of claim 1, wherein biasing means are provided on each peeling unit to maintain pressure between said grip members and the banana before said grip members are moved away from the fruit while simultaneously allowing each said peeling unit to move and thereby adjust to the varying width of the diameter of the banana as it passes through said passage.

9. The apparatus of claim 1, wherein each said peeling unit includes a cooperating feed unit adapted to drive and feed the banana through said passage.

10. The apparatus of claim 9, wherein each said feed unit includes power driven rollers which are adapted to engage and drive the banana through said passage.

11. The apparatus of claim 10, wherein second biasing means are provided on each said feed unit to maintain pressure between said rollers and the banana while simultaneously allowing each said feed unit to move and thereby adjust to the varying width of the diameter of the banana as it passes between the plurality of feed units.

12. The apparatus of claim 1, wherein each said peeling unit includes a wheel member, said grip members mounted on said wheel member, power drive means operably connected to each said peeling unit and adapted to rotate each said wheel member at the same rate.

13. The apparatus of claim 12, wherein a cooperating feed unit is provided for each said peeling unit to drive the banana through said passage, each said feed unit having rollers rotated at the same rate by said power drive means.

14. The apparatus of claim 13, wherein adjusting means are provided to permit each said peeling unit and each said feed unit to move when in contact with a banana and thereby adjust to the varying width of the diameter of the banana as it passes between said peeling units and through said passage without affecting the rate at which said wheel members and said rollers are driven by said power means.

15. The apparatus of claim 1, wherein two peeling units are provided with each said peeling unit positioned opposite to each other.

16. The apparatus of claim 1, wherein four peeling units are provided with each said peeling unit positioned perpendicular to said adjacent peeling units.

17. The apparatus of claim 1, wherein gate means are provided to control the passing of the banana into said passage.

18. The apparatus of claim 1, wherein means are provided to guide the banana longitudinally through said passage.

19. An apparatus for removing the peel from the fruit of a banana, comprising:
   a housing having a peeling chamber;
   an opening in said housing through which the banana is passed into said peeling chamber;
   a plurality of peeling units mounted on said housing and extending into said peeling chamber and defining a passage between them through which the banana is adapted to pass;
   means to guide the banana longitudinally through said peeling chamber and said passage;
   a plurality of grip members on each said peeling unit adapted to engage and grip the peel segments as the banana moves through said passage;
   vacuum means associated with each said peeling unit adapted to initiate gripping of the peel segments by said grip members by sucking air from the interior of said grip members when said grip members engage said peel segments;
   means to move said grip members gripping said peel segments away from the fruit of the banana whereby the segments are pulled from the fruit to completely remove the peel from the banana; and
   means to remove the segments from said grip members.

20. The apparatus of claim 19, wherein said vacuum means comprises a first vacuum unit and a second vacuum unit, said grip members on each said peeling unit including a first group of grip members and a second group of grip members, said first group of grip members alternately positioned with respect to said second group of grip members, said first vacuum unit associated with said first group of grip members and said second vacuum unit associated with said second group of grip members whereby a firm grip of the peel segments by at least one of said grip members on each said peeling unit is insured during pulling of the peel segments from the fruit.

21. The apparatus of claim 19, wherein said release means comprises a first pressure unit and a second pressure unit, said grip members on each said peeling unit including a first group of grip members, and a second group of grip members, said first group of grip members alternately positioned with respect to said second group of grip members, said first pressure unit associated with said first group of grip members and said second pressure unit associated with said second group of grip members whereby said first and second pressure units apply pressure through each said grip member of said first and second group of grip members respectively to release the peel segments pulled from the fruit from said grip members.

22. The apparatus of claim 19, wherein each said peeling unit includes a wheel member and means to rotate said wheel member, said grip members being mounted on the periphery of said wheel members and said wheel members adapted to rotate in a plane parallel to the longitudinal axis of the banana passing through said passage to cause said grip members to first engage the peel of the banana in said passage and then move away from the fruit of the banana in said passage.

23. The apparatus of claim 22, wherein said housing includes a feed tube adjacent said opening in said housing, said feed tube including first control means adapted to engage the banana when placed in said feed tube and to synchronize said means for rotating said wheel members, gate means adapted to block said opening in said housing, second control means associated with the rotation of one of said wheel members to open said gate means whereby the banana is dropped into said passage and into engagement with a group of said grip members on each said wheel member when said wheel members are at a predetermined position.

24. The apparatus of claim 22, wherein four peeling units are provided with said wheel member of each said peeling unit positioned between two other wheel members and opposite another wheel member, the plane of rotation of each said wheel member parallel to the plane of rotation of the opposite wheel member, and said wheel members defining said passage.

25. The apparatus of claim 19, wherein a disposal unit positioned below said peeling units is provided, said disposal unit including a central opening adjacent and below said passage through which the fruit of the banana is adapted to pass and a circular trough surrounding said central opening into which the peel segments of the banana are adapted to drop after being released from said grip members and means adapted to remove the dropped peel segments from said circular trough.

26. The apparatus of claim 19, wherein each said grip member comprises a suction cup formed of a flexible material.

27. The apparatus of claim 26, wherein said grip members are arranged in groups with a flexible web connecting the grip members in each said group.

28. An apparatus for processing bananas, comprising:
a container holding a liquid;
a housing on said container located above said liquid and having a peeling chamber and a peeling mechanism, means on said housing adapted to feed bananas into said peeling chamber at predetermined intervals;
said peeling mechanism having a plurality of grip members in said peeling chamber adapted to contact and grip the sides of the peel of each banana fed into said peeling chamber and to pull the peel of each banana off in longitudinal segments from the fruit of the banana;
disposal means positioned below said peeling chamber adapted to permit the peeled bananas to pass from said peeling chamber into said liquid while collecting the removed peel segments from said grip members;
conveyor means positioned below said peeling chamber and adapted to transport the peeled bananas from said liquid; and
means adapted to guide the peeled bananas in said liquid onto said conveyor means.

29. The apparatus of claim 28, wherein said peeling mechanism comprises a plurality of peeling units, each said peeling unit having a wheel member with said grip members positioned at spaced intervals on a periphery of said wheel member, said wheel members defining a passage through which the bananas are longitudinally passed, each of said wheel member adapted to rotate in plane parallel to the longitudinal axis of the bananas passing through said passage to cause said grip members on each said wheel member to first engage the sides of a banana in said passage and then move away from the longitudinal axis of the banana in said passage, and means to rotate said wheel members.

30. The apparatus of claim 29, wherein each said peeling unit includes vacuum means adapted to suck air during a predetermined interval from the interior of said grip members contacting the peel of a banana in said passage to create a vacuum between said grip members and the banana peel.

31. The apparatus of claim 29, wherein each said peeling unit includes pressure means adapted to blow gas during a predetermined interval through the interior of said grip members pulling on the peel of a banana in said passage to release the peel segments from said grip members.

32. A method of removing the peel from the fruit of a banana, the steps comprising:
passing the banana longitudinally through a passage;
engaging the peel of the banana in said passage with a plurality of grip members positioned around the circumference of the banana;
sucking air from the interior of said grip members engaging the peel to create a vacuum between said grip members thereby causing said grip members to firmly grip the peel; and
moving the grip members firmly gripping the peel away from the longitudinal axis of said passage while the fruit of the banana in said passage continues to move through said passage parallel to the longitudinal axis of said passage thereby causing the peel to be pulled off in longitudinal segments from the fruit.

33. The method of claim 32, wherein the peel of the banana fed into said passage is partially sliced to initiate the separation of the peel into longitudinal segments.

34. The method of claim 32, wherein gas is blown through the interior of said grip members to remove the peel segments pulled from the fruit from said grip members.

35. The method of claim 32, wherein the peeled fruit is passed from said passage into a liquid and the peel segments pulled from the fruit are released from said grip members into a disposal unit.

36. The method of claim 32, wherein the banana is drivingly fed through said passage.

37. A method of processing bananas, the steps comprising:
feeding the bananas one at a time longitudinally through a passage;
engaging the peel of a banana in said passage with a plurality of a set of grip members each mounted on the periphery of one of a plurality of wheel members which are positioned around the circumference of said passage;
sucking air from the interior of said set of grip members to create a vacuum between said grip members and the peel;
rotating the wheel members in a plane parallel to the axis of said passage to move each said grip member away from the axis of said passage thereby pulling the peel off in longitudinal segments from the fruit of the banana while the fruit continues to move parallel to the axis of said passage;
engaging the peel with a plurality of another set of grip members each mounted on the periphery of one of said wheel members and positioned adjacent to one of said first set of grip members;
sucking air from the interior of said second set of grip members;
further rotating said wheel members to move said second set of grip members away from the axis of said passage and to further pull the peel from the fruit; and
continuing to engage the peel with other sets of grip members on said wheel members, then sucking air from those grip members and further rotating said wheel members to further pull the peel segments from the fruit until the peel is completely removed from the banana fed into said passage.

38. The method of claim 37, wherein the bananas fed into said passage are first partially sliced to initiate the separation of the peel into longitudinal segments.

39. The method of claim 37, wherein gas is blown through each set of grip members to remove the peel segments from those grip members after they have pulled the peel segments off the fruit.

40. The method of claim 37, wherein the peeled fruit of each banana is passed from said passage into a liquid and the peel segments pulled from the fruit of each banana are dropped into a disposal unit after being removed from said grip members.

41. The method of claim 40, wherein the peeled bananas in said liquid are guided to a conveyor then transported from said liquid for further processing.

42. The method of claim 37, wherein the bananas are drivingly fed into said passage.

43. An apparatus for removing the peel from the fruit of a banana, comprising:
- a peeling mechanism, having a plurality of peeling units, said peeling units defining a passage between them through which the banana is adapted to pass longitudinally;
- grip members on each said peeling unit adapted to suck on the sides of the peel as the banana moves through said passage; and
- means to move each said grip member sucking the peel along a curved path progressively away from the banana whereby the peel is separated into longitudinal segments which are pulled and removed from the fruit.

* * * * *